Dec. 30, 1958   B. W. RECHNITZER   2,866,945
ELECTRONIC POWER SUPPLY
Filed Feb. 3, 1955   2 Sheets-Sheet 1

Inventor:
Buren W. Rechnitzer,
by Merton D. Moss
His Attorney.

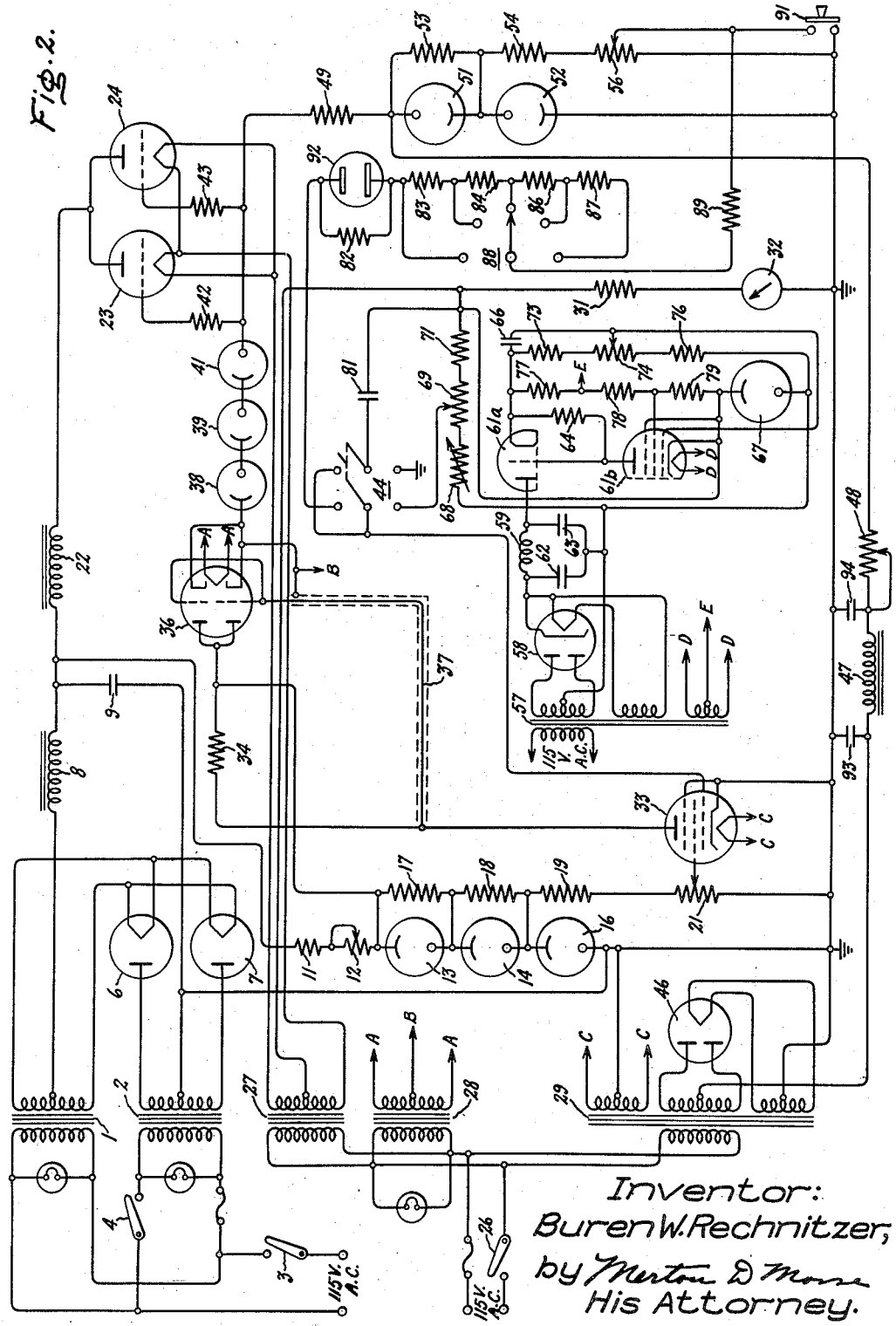

United States Patent Office 2,866,945
Patented Dec. 30, 1958

2,866,945

ELECTRONIC POWER SUPPLY

Buren W. Rechnitzer, Delmar, N. Y., assignor to General Electric Company, a corporation of New York Application February 3, 1955, Serial No. 485,865

9 Claims. (Cl. 323—4)

This invention relates to an electronic power supply and more particularly to such a supply as is suitable for use with a low impedance load, such as the magnet coil of a mass spectrometer.

It is frequently desired in the electrical art to provide a highly stabilized direct current power supply. Such supplies are specially useful in devices such as electron microscopes, mass spectrometers, and the like, where the impedance load is small and the power source must be extremely stable in order to prevent any drift in the instrument.

In instruments of the type noted above, in order to provide this highly stabilized direct current, battery power supplies have frequently been used. However, such supplies are subject to variations in voltage when current is drawn from them and they also vary in response to changes in room ambient temperatures, causing the instruments to drift. Further, battery supplies are bulky, weighty, need constant checking, and have a high replacement cost. However, when electronic power supplies were substituted for battery power supplies, the ripple factor of the former supplies made their use difficult, if not impossible, in the above instruments. The present invention has been able to reduce the ripple factor of an electronic power supply to a satisfactory minimum so as to make the supply useable in the instruments noted above.

It is, therefore, one object of this invention to provide an electronic power supply for producing controlled values of direct current from small to large amounts.

It is another object of this invention to provide an electronic power supply in which the ripple factor has been reduced to a minimum.

Other objects and advantages will appear as the description of the invention proceeds.

In accordance with the invention, an electronic power supply is provided which will produce large amounts of direct current with a very small ripple factor. This is accomplished by connecting in series circuit with a load fed by a high voltage power supply, a power amplifier and a signal source across which some indication may be derived of the load current. An electronic reference supply voltage is produced within the equipment and opposed to the output from the signal source, the difference between the two signals being amplified, inverted in phase, and fed into the power amplifier. The power amplifier is strongly biased and the amplified difference signal is opposed to this bias and enables the amplifier to conduct. By using such a circuit, all of the foregoing objects have been attained.

Incorporated within the electronic power supply of the invention, is the aforementioned reference voltage supply which is especially adapted to provide a voltage output with a very small ripple which can be opposed to the output voltage derived from the signal source. This reference voltage supply comprises a power amplifier having a compound load including a regulator tube in its circuit. A portion of the voltage developed across the load is fed into a controlled amplifier which amplifies and inverts its input and feeds it into the power amplifier to compensate for any change in the current therethrough. The output voltage is derived across the regulator tube, and by maintaining the current through this tube at a constant value, its voltage also remains constant. This output voltage is the one that is opposed to that of the signal source.

The features of this invention which are believed to be novel and patentable are pointed out in the claims which form a part of this specification. For a better understanding of the invention, reference is now made to the accompanying drawings, wherein like parts are indicated by like reference numerals, in which:

Fig. 2 is a circuit diagram of the embodiment of the invention shown in Fig. 1.

Figure 1:
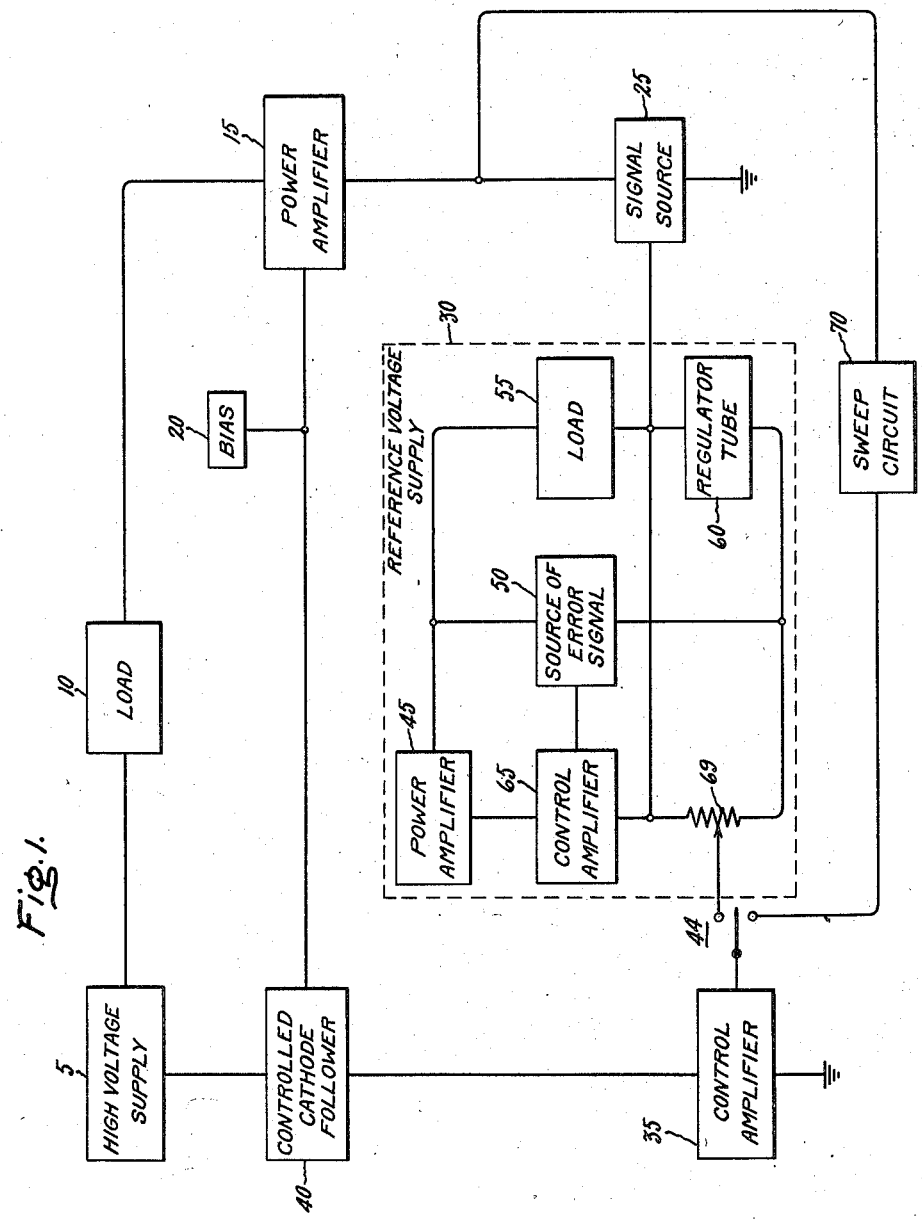
Fig. 1 is a block diagram showing one embodiment of the invention.

Referring now to Fig. 1, there is shown a high voltage supply 5, which could be any one of the many such supplies known to the art. Connected in series with supply 5, is a load 10, which could be the voltage coil of an electromagnet on a mass spectrometer or electron microscope, or any other load requiring a great deal of current with a very low ripple factor. The series circuit is completed to ground through a power amplifier 15 which is biased by a bias circuit 20, through a signal source 25 across which an indication of the current flowing through the load may be developed. A reference supply voltage 30 is provided and the output of this supply is opposed to the output from the signal source 25 and fed to a high impedance control amplifier 35 through a switch 44 when this switch is in its upper position. The control amplifier serves to amplify and invert the difference between the reference supply voltage and the voltage developed across the signal source, and this amplified and inverted voltage is fed into the power amplifier through an isolation or buffer circuit such as a cathode follower 40. The output from the isolation circuit is used to oppose the output from bias 20 and thereby enables the power amplifier 15 to conduct and permit current to flow through load 10. It will be seen from this circuit, that any variation in voltage supply 5 will be reflected by a variation in the output from signal source 25, and that this latter output will be opposed to the output from supply voltage 30, amplified, and used to change the bias on power amplifier 15 in such a way as to counteract the first-mentioned change. By means of this circuit, it has become possible to obtain an electronic power supply which will deliver large amounts of current with an extremely small ripple factor.

The reference supply voltage 30, contains therein a power amplifier 45 having a compound load connected in series therewith and comprising a source of error signal 50, a load 55, and a regulator tube 60. The potential developed across source 50 is fed into a control amplifier 65 where it is amplified, inverted, and applied to power amplifier 45 in such a way as to nullify any change in the current of the regulator tube 60. The output of the circuit is developed across regulator tube 60, which has a potentiometer 69 thereacross, leading through the switch 44 to control amplifier 35. The difference between the voltage of signal source 25 and the voltage across the regulator tube is taken off from potentiometer 69 and applied to control amplifier 35, in the manner noted above. By maintaining the current through the regulator tube 60 at a constant value its voltage is maintined constant and extremely good reference supply voltage is attained, a supply voltage which is particularly well adapted for use with the electronic power supply of the invention.

As noted above, the electronic power supply of the invention is especially well adapted for use with the analytical mass spectrometer of the General Electric Company, and Figs. 1 and 2 show how it could be incorporated into this instrument. Referring more particularly to Fig. 1, when switch 44 is thrown into its lower position, it disconnects potentiometer 69 from control amplifier 35 and instead connects a sweep circuit 70 to this amplifier. Sweep circuit 70 is also connected to the output from signal source 25 and is opposed by this output so as to provide a long slow sweep. The output of the sweep circuit causes control amplifier 35 once again to change the current through load 10 in the manner set forth above.

Referring now to Fig. 2, there is shown the schematic diagram of the invention of Fig. 1. This figure includes a pair of transformers labelled 1 and 2; the primary windings of these transformers both lead to a pair of terminals marked 115 v. A. C. through a switch 3. The primary winding of transformer 2 also has a switch 4 connected in series therewith, and both the primary windings of transformers 1 and 2, respectively, have indicator lights connected in parallel therewith. The secondary winding of transformer 1 is connected to the filaments of a pair of power diodes 6 and 7, the secondary of transformer 2 being connected to the anodes of tubes 6 and 7 in the manner shown. The secondary winding of transformer 1 has a center tap leading to a choke 8 and a capacitor 9, said capacitor also being connected to a center tap on the secondary winding of transformer 2, this latter center tap being connected to ground. Disposed between the junction point of choke 8 and capacitor 9 and ground are the following elements connected in series: a resistor 11, a potentiometer 12, and three glow discharge tubes 13, 14 and 16, connected in the manner shown. Connected in parallel with tube 13 is a resistor 17; connected in parallel with tube 14 is a resistor 18, and a resistor 19 and a potentiometer 21 are connected in series with one another and in parallel with tube 16. All of the foregoing elements set forth a type of high voltage supply that is well known to the art and is shown in block 5 of Fig. 1.

Also connected to the junction point of choke 8 and capacitor 9 is an inductance 22 which could be the coil for an electromagnet on the analytical General Electric mass spectrometer, for which instrument this supply is especially well adapted. Coil 22 corresponds to load 10 in Fig. 1.

Coil 22 is connected to the anodes of a pair of triode amplifier tubes 23 and 24, the heater elements of these tubes, which are also their cathodes, being connected in parallel. These tubes correspond to power amplifier 15 in Fig. 1.

Also connected to the souce of 115 v. A. C. are a pair of terminals connected through a switch 26 and a fuse to three transformers labelled 27, 28 and 29. The secondary winding of transformer 27 is connected across the heater elements of tubes 23 and 24, and a center tap on this winding is connected through a resistor 31 and an ammeter 32 to ground. Resistor 31 corresponds to signal source 25 in Fig. 1.

From the foregoing description, it will be apparent that coil 22, which constitutes the load for the circuit of this invention, is connected in such a way that the current flowing therethrough must flow through tubes 23 and 24 as well as through resistor 31 and ammeter 32, and that this ammeter will read this current.

A high amplification, high impedance, pentode vacuum tube 33 is also provided, and it has its anode connected through a resistor 34 to the anodes of a dual triode vacuum tube 36. Tube 33 constitutes the control amplifier 35 of Fig. 1, and tube 36 is the controlled cathode follower 40 of Fig. 1. The control grids of this latter tube are connected together, its cathodes also being connected together. The anode of tube 33 is also connected by means of a shielded lead 37 to the control grids of tube 36, the cathodes of tube 36 being connected to the shielding of this lead. Lead 37 is shielded in order to minimize stray pick-up which could occur due to the high impedance circuits to which it is connected.

The cathodes of tube 36 are also coupled through three series connected glow discharge regulator tubes 38, 39 and 41 to a pair of resistors 42 and 43 which are respectively connected to the grids of tubes 23 and 24. Cathode follower tube 36 thus presents a high impedance to the output of amplifier 33, and the regulator tubes in its cathode circuit cause it to be "stiff" in opposing the bias potential on tubes 23 and 24. The secondary winding of transformer 28 is labelled A—A to indicate that it is connected across the heater element of tube 36 which is also labelled A—A; while the center tap of this winding is labelled B to indicate that it is connected to the shielding on lead 37 which also is labelled B. The primary winding of transformer 28 has an indicator light placed thereacross in a conventional manner.

Returning again to tube 33, we find that the suppressor grid and the cathode of this tube are connected together and to ground, while the screen grid thereof is connected to the moving element of potentiometer 21. The heater elements of this tube are labelled C—C to indicate that they are fed by the topmost secondary winding of transformer 29, which winding is also labelled C—C and has a grounded center tap. The control grid of this tube leads to one center terminal of a double pole, double throw switch labelled 44, which switch will be explained further in the specification and which corresponds to the like numbered switch in Fig. 1.

The middle secondary winding of transformer 29 is connected across the anodes of a tube 46, the center tap of this winding being connected through a choke 47 and a potentiometer 48 to a resistor 49 which leads to the grids of tubes 23 and 24. Connected on either side of choke 47, between this choke and ground, are a pair of capacitors 93 and 94. The heater elements of tube 46 are in parallel with the bottom secondary winding of transformer 29, this winding having a center tap leading to ground.

Tube 46 together with elements 47, 48 and 49 form a conventional power supply for producing a negative potential relative to ground, and they correspond to bias 20 of Fig. 1.

This negative potential is maintained constant by a pair of voltage regulator tubes 51 and 52 connected in series and between the junction of elements 48 and 49 and ground. A resistor 53 is placed in parallel with tube 51, while a resistor 54 and a potentiometer 56 are connected in series with one another and in parallel with tube 52. The foregoing described circuit provides a negative D. C. bias for tubes 23 and 24.

Another transformer 57 is also provided having its primary winding connected to the 115 volt source of A. C. The top secondary winding of this transformer is connected to the anodes of a rectifier tube 58, the heater element of this tube being connected to the middle secondary winding. The cathode of this tube is connected through a choke 59 to the anode of a triode 61a. A pair of capacitors 62 and 63 are disposed between either ends of choke 59 and a center tap on top secondary winding of transformer 57. The control grid of triode 61a is connected to the anode of a pentode tube labelled 61b. Tubes 61a and 61b are shown as having a common envelope, although this need not necessarily be the case. Tube 61a is the power amplifier 45 of Fig. 1, and tube 61b is the control amplifier of Fig. 1.

The bottom one of the secondary windings of transformer 57 are labelled D—D to indicate that they are connected to the heater of tube 61, also labelled D—D. The cathode of tube 61a is connected through a resistor 64 to the anode of tube 61b and also through a capacitor 66 to the control grid of tube 61b. The suppressor grid and cathode of tube 61b are connected together and to the anode of a regulator tube 67, the cathode of this regulator tube being connected to the center tap of the top secondary winding of transformer 57 and also to a potentiometer 68. Tube 67 corresponds to regulator tube 60 in Fig. 1.

Potentiometer 68 is connected in series with a potentiometer 69 and a resistor 71, this latter resistor being connected to the anode of tube 67. Potentiometer 69 corresponds to the like named element in Fig. 1. Interconnecting the cathodes of tubes 61a and 67 are the following series connected elements: a resistor 73, a potentiometer 74 and a resistor 76, the center of potentiometer 74 being connected to the control grid of tube 61b and also to capacitor 66. These elements constitute the source of error signal 50 of Fig. 1.

The cathode of tube 61a is connected to the anode of tube 67 through three series connected resistors labelled 77, 78 and 79, the junction between resistors 78 and 79 being connected to the screen grid of tube 61b in order to compensate for any fluctuation in supply voltage in this way as well as from the source of error signal. The junction between resistors 77 and 78 is labelled E to indicate that it goes to a center tap labelled E on the bottom secondary winding of transformer 57. These resistors constitute the load 55 of Fig. 1, this load, regulator tube 60, and source of error signal 50 constituting a compound load for power amplifier 45 in Fig. 1.

Referring once again to the double pole, double throw switch labelled 44, it will be recalled that one center terminal was connected to the control grid of tube 33. This same terminal is also connected to an upper terminal of this switch. The other center terminal of this switch is connected through a capacitor 81 to the junction point between resistors 31 and 71. One bottom terminal of this switch is connected to ground, while the other bottom terminal is connected to the center of potentiometer 69. One top terminal of this switch is connected to a group of series connected resistors labelled 82, 83, 84, 86 and 87. A switch 88 is so arranged that it can switch resistors 83, 84, 86, and 87 in or out of the series combination, at the will of the operator, the center of this switch being connected through a resistor 89 to a hand-operated switch 91 as well as to the center tap of potentiometer 56. These resistors and the potentiometer, as well as capacitor 81 comprise the sweep circuit 70 of Fig. 1. Switch 91 has one terminal grounded. Connected across resistor 82 is a plug 92 which enables the operator to plug various types of resistors in parallel through resistor 82 to thereby change the effective resistance of the circuit within which it is disposed.

Now will be explained in detail, the operation of the circuit shown in Fig. 2. Firstly, switches 3 and 26 are closed in order to provide filament voltages for all of the tubes and activate all of the tubes but 6 and 7. Then the operator closes switch 4, in order to apply voltage to the anodes of tubes 6 and 7 and place a high voltage at one end of load 22. Switch 44 is then thrown down into its lower position.

When all of these switches have been closed in the manner just indicated, a highly positive voltage will have been applied to load 22, a highly negative bias will have been applied to the control grids of tubes 23 and 24, a positive reference supply voltage will have been opposed by the voltage developed across resistor 31 and fed as an input to amplifier tube 33, and this input voltage will have been amplified, inverted, and fed through cathode follower 36 to the control grids of tubes 23 and 24 so as to oppose the negative bias on these grids. Current will therefore be flowing through load 22, through tubes 23 and 24, through signal source resistor 31, and down through ammeter 32 to ground and thence back to the high voltage supply derived from tubes 6 and 7 to the other side of load 22. The operator then adjusts potentiometer 69 until the ammeter 32 reads any value of current that he desires to have flowing through load 22.

This circuit has been shown as it could be incorporated into the analytical mass spectrometer of the General Electric Co.; consequently, switch 44 has been provided in order to enable the operator of the spectrometer to sweep the current within load 22 through a given range. This the operator accomplishes by throwing switch 44 into its upper position. By this action, the reference voltage supply output is disconnected from the input to amplifier 33, and the output of the sweep circuit, opposed by the voltage developed across resistor 31, is fed to the input of amplifier tube 33. The sweep circuit comprises capacitor 81 and resistors 82, 83, 84, 86, 87 and 89 and potentiometer 56. The operator moves switch 88 so as to select the numbers of resistors he wishes to place in series with sweep capacitor 81, and he can also adjust potentiometer 56 to make fine sweep adjustments. A plug 92 is provided in order that additional resistances may be used if different lengths of sweeps, other than those provided for in the equipment, are needed. The push button 91 is used to short circuit the sweep circuit and bring the current through load 22 back to its original value when the operator of the mass spectrometer desires to re-scan a particular mass peak.

In constructing the electronic power supply shown in Fig. 2, the various elements thereof had the following values:

| Elements | Numbers | Values |
| --- | --- | --- |
| Capacitors | 9 | 10 μfd. |
|  | 62 | 8 μfd. |
|  | 63 | 8 μfd. |
|  | 66 | 0.001 μfd. |
|  | 81 | 10 μfd. |
|  | 93 | 16 μfd. |
|  | 94 | 16 μfd. |
| Tubes | 6 | 872 A. |
|  | 7 | 872 A. |
|  | 13 | OD 3. |
|  | 14 | OD 3. |
|  | 16 | OD 3. |
|  | 23 | 5C24. |
|  | 24 | 5C24. |
|  | 33 | 5693. |
|  | 36 | 6SN7-GTB. |
|  | 38 | 5651. |
|  | 39 | 5651. |
|  | 41 | 5651. |
|  | 46 | 5Y3. |
|  | 51 | OD 3. |
|  | 52 | OD 3. |
|  | 58 | 5Y3. |
|  | 61 | 6U8. |
|  | 67 | 5651. |
| Resistors | 11 | 20K ohms. |
|  | 17 | 50K ohms. |
|  | 18 | 50K ohms. |
|  | 19 | 35K ohms. |
|  | 31 | 150 ohms. |
|  | 34 | 20M ohms. |
|  | 42 | 1K ohms. |
|  | 43 | 1K ohms. |
|  | 49 | 100K ohms. |
|  | 53 | 50K ohms. |
|  | 54 | 39K ohms. |
|  | 64 | 820K ohms. |
|  | 71 | 450 ohms. |
|  | 73 | 180K ohms. |
|  | 76 | 62K ohms. |
|  | 77 | 20K ohms. |
|  | 78 | 20K ohms. |
|  | 79 | 6.8K ohms. |
|  | 82 | 20M ohms. |
|  | 83 | 0.47M ohms. |
|  | 84 | 0.47M ohms. |
|  | 86 | 0.47M ohms. |
|  | 87 | 0.47M ohms. |
|  | 89 | 1M ohms. |
| Potentiometers | 12 | 20K ohms. |
|  | 21 | 10K ohms. |
|  | 48 | 5K ohms. |
|  | 56 | 10K ohms. |
|  | 68 | 5K ohms. |
|  | 69 | 50K ohms. |
|  | 74 | 50K ohms. |
| Chokes | 8 | 8 henries. |
|  | 47 | 12 henries. |
|  | 59 | 36 henries. |

When an electronic power supply in accordance with the invention was constructed, in which the various components had the values noted above, it was found that the overall loop gain of this system was approximately 3300, and that the short term percentage of regulation of this circuit was 0.003%, the long term percentage of regulation being 0.03%. This supply was particularly well adapted for use with the analytical General Electric mass spectrometer; however, any load which requires a highly stabilized direct current of up to 500 milliamperes and having an impedance between 900 and 1200 ohms could be used with a supply having the values noted above.

It should be understood that the present invention is not limited to any particular kinds of vacuum tubes since it will be obvious to those skilled in the art that the tubes shown in Fig. 2 may be replaced by those which will perform fully as well. It should also be understood that a power supply in accordance with the invention could be constructed for many values of load impedances and various amounts of current.

While there has been described what is at present considered a preferred embodiment of the invention, it will be obvious to those skilled in the art that various changes and modifications may be made therein without departing from this invention; and it is aimed in the appended claims to cover all such changes and modifications as fall within the true spirit and scope of the invention.

What I claim as new and desire to secure by Letters Patent of the United States is:

1. An electronic power supply comprising, biased power amplifier means adapted to be connected in series with a load which is fed from a voltage supply, signal source means connected in series with said power amplifier means for deriving a voltage signal indicative of the current through said load, independent fixed reference supply voltage means connected to the output of said signal source means, high impedance means for amplifying the voltage difference between the outputs of said signal source means and said reference supply voltage means, and isolation means for feeding the output of said high impedance means into said power amplifier means in such a way as to oppose the bias of this latter means and control its conductivity.

2. An electronic power supply comprising, biased power amplifier means adapted to be connected in series with a load which is fed from a voltage supply, signal source means connected in series with said power amplifier means for deriving a voltage signal indicative of the current through said load, independent fixed reference supply voltage means connected to the output of said signal source means, high impedance means for amplifying the voltage difference between the outputs of said signal source means and said reference supply voltage means, and cathode follower isolation means for feeding the output of said high impedance means into said power amplifier means in such a way as to oppose the bias of this latter means and control its conductivity, said cathode follower isolation means including at least one regulator tube means in its cathode circuit.

3. An electronic power supply for a mass spectrometer comprising, biased power amplifier means adapted to be connected in series with a load which is fed from a voltage supply, signal source means connected in series with said power amplifier means for deriving a voltage signal indicative of the current through said load, reference supply voltage means connected to the output of said signal source means, sweep circuit means connected to the output of said signal source means, high impedance amplifier means selectively connected through switch means to either the voltage difference between the outputs of said signal source means and said reference supply voltage means or the voltage difference between the outputs of said sweep circuit means and said signal source means, and cathode follower isolation means for feeding the output of said amplified means into said power amplifier means in such a way as to oppose the bias of this latter means and control its conductivity, said cathode follower isolation means including at least one regulator tube means in its cathode circuit.

4. An electronic power supply comprising: biased power amplifier means adapted to be connected in series with a load which is fed from a voltage supply; signal source means connected in series with said biased power amplifier means for deriving a voltage signal indicative of the current through said load; a reference supply voltage circuit connected to the output of said signal source means and including power amplifier means, compound load means for said power amplifier means and including voltage regulator tube means, and control amplifier means connected between said load means and said power amplifier means for cancelling out any variations in the current output of said power amplifier means, the voltage across said regulator tube being the desired reference supply voltage; high impedance means for amplifying the voltage difference between the outputs of said signal source means and said reference supply voltage circuit; and isolation means for feeding the output of said high impedance means into said biased power amplifier means in such a way as to oppose the bias of this latter means and control its conductivity.

5. An electronic power supply comprising: biased power amplifier means adapted to be connected in series with a load which is fed from a voltage supply; signal source means connected in series with said biased power amplifier means for deriving a voltage signal indicative of the current through said load; a reference supply voltage circuit connected to the output of said signal source means and including power amplifier means, compound load means for said power amplifier means and including voltage regulator tube means, and control amplifier means connected to a portion of said load means for amplifying and inverting in phase any variations in current through said load means and applying them to said power amplifier means so as to cancel out any current variations in the output of said power amplifier means, the voltage across said regulator tube being the desired reference supply voltage; high impedance means for amplifying the voltage difference between the outputs of said signal source means and said reference supply voltage circuit; and isolation means for feeding the output of said high impedance means into said biased power amplifier means in such a way as to oppose the bias of this latter means and control its conductivity.

6. An electronic power supply comprising: biased power amplifier means adapted to be connected in series with a load which is fed from a voltage supply; signal source means connected in series with said biased power amplifier means for deriving a voltage signal indicative of the current through said load; a reference supply voltage circuit connected to the output of said signal source means and including power amplifier means, compound load means for said power amplifier means and including voltage regulator tube means, and control amplifier vacuum tube means having at least two grids respectively connected to two portions of said load means for amplifying and inverting in phase any variations in current through said load means and applying them to said power amplifier means so as to cancel out any current variations in the output of said power amplifier means, the voltage across said regulator tube being the desired reference supply voltage; high impedance means for amplifying the voltage difference between the outputs of said signal source means and said reference supply voltage circuit; and isolation means for feeding the output of said high impedance means into said biased power amplifier means in such a way as to oppose the bias of this latter means and control its conductivity.

7. An electronic power supply comprising: biased power amplifier means adapted to be connected in series with a load which is fed from a voltage supply; signal source means connected in series with said biased power amplifier means for deriving a voltage signal indicative of the current through said load; a reference supply voltage circuit connected to the output of said signal source means and including power amplifier means, compound load means for said power amplified means and including voltage regulator tube means, and control amplifier means connected to a portion of said load means for amplifying and inverting in phase any variations in current through said load means and applying them to said power amplifier means so as to cancel out any variations in the output of said power amplifier means, the voltage across said regulator tube being the desired reference supply voltage; high impedance means for amplifying the voltage difference between the outputs of said signal source means and said reference supply voltage circuit; and cathode follower isolation means for feeding the output of said high impedance means into said biased power amplifier means in such a way as to oppose the bias of this latter means and control its conductivity, said cathode follower isolation means including at least one regulator tube means in its cathode circuit.

8. An electronic power supply for a mass spectrometer comprising: biased power amplifier means adapted to be connected in series with a load which is fed from a voltage supply; signal source means connected in series with said biased power amplifier means for deriving a voltage signal indicative of the current through said load; a reference supply voltage circuit connected to the output of said signal source means and including power amplifier means, compound load means for said power amplifier means and including voltage regulator tube means, and control amplifier means connected to a portion of said load means for amplifying and inverting in phase any variations in current through said load means and applying them to said power amplifier means so as to cancel out any variations in the output of said power amplifier means, the voltage across said regulator tube being the desired reference supply voltage; sweep circuit means connected to the output of said signal source means; high impedance amplifier means selectively connected through switch means to either the voltage difference between the outputs of said signal source means and said reference supply voltage circuit or the voltage difference between the outputs of said sweep circuit means and said signal source means; and cathode follower isolation means for feeding the output of said high impedance amplifier means into said biased power amplifier means in such a way as to oppose the bias of this latter means and control its conductivity, said cathode follower isolation means including at least one regulator tube means in its cathode circuit.

9. An electronic power supply for a mass spectrometer comprising: biased power amplifier means adapted to be connected in series with a load which is fed from a voltage supply; signal source means connected in series with said biased power amplifier means for deriving a voltage signal indicative of the current through said load; a reference supply voltage circuit connected to the output of said signal source means and including power amplifier means, compound load means for said power amplifier means and including voltage regulator tube means, and control amplifier vacuum tube means having at least two grids respectively connected to different portions of said load means for amplifying and inverting in phase any variations in current through said load means and applying them to said power amplifier means so as to cancel out any variations in the output of said power amplifier means, the voltage across said regulator tube being the desired reference supply voltage; sweep circuit means connected to the output of said signal source means; high impedance amplifier means selectively connected through switch means to either the voltage difference between the outputs of said signal source means and said reference supply voltage circuit or the voltage difference between the outputs of said sweep circuit means and said signal source voltage means and cathode follower isolation means for feeding the output of said high impedance amplifer means into said biased power amplifier means in such a way as to oppose the bias of this latter means and control its conductivity, said cathode follower isolation means including at least one regulator tube means in its cathode circuit.

References Cited in the file of this patent

UNITED STATES PATENTS

| | | |
|---|---|---|
| 1,858,271 | Harness et al. | May 17, 1932 |
| 2,466,537 | De Vore | Apr. 5, 1949 |
| 2,511,850 | Hoag | June 20, 1950 |
| 2,575,107 | Hobbs et al. | Nov. 13, 1951 |